United States Patent [19]
Kozima et al.

[11] Patent Number: 5,233,627
[45] Date of Patent: Aug. 3, 1993

[54] MULTIMODE MODEM FOR FACSIMILE

[75] Inventors: Yasuyuki Kozima; Yasushi Yokosuka, both of Hitachi, Japan

[73] Assignee: Hitachi, Ltd., Tokyo, Japan

[21] Appl. No.: 439,544

[22] Filed: Nov. 20, 1989

[30] Foreign Application Priority Data

Nov. 22, 1988 [JP] Japan .................... 63-293507

[51] Int. Cl.$^5$ .................. H04B 1/38; H04L 5/16
[52] U.S. Cl. ........................... 375/8; 375/98; 375/120
[58] Field of Search ........ 375/8, 106, 121, 119, 375/120, 98, 79, 100; 358/114, 13, 409, 413, 443, 442; 370/84; 379/96-100; 455/133-135, 75, 76

[56] References Cited

U.S. PATENT DOCUMENTS

| 4,215,243 | 7/1980 | Maxwell | 375/9 X |
| 4,833,696 | 5/1989 | Ichiyoshi | 375/8 X |
| 4,931,250 | 6/1990 | Greszczuk | 375/8 |

OTHER PUBLICATIONS

Rockwell 1985 Data Book, pp. 7-7-7-19 "R96 FAX 9600 BPS Facsimile Modem."

Primary Examiner—Curtis Kuntz
Assistant Examiner—Tesfaldet Bocure
Attorney, Agent, or Firm—Kenyon & Kenyon

[57] ABSTRACT

A modem (modulator-demodulator) apparatus provided with modem circuits having different signal processing standards, which is optimized for a facsimile machine. Switching of modem functions can be accurately performed by concurrently operating modems with required standards selected from modems with different standards incorporated in a modem apparatus and incorporating in a common input/output port means for selectively switching an input/output of each modem and a dedicated signal detection means required for the switching, and further by constituting a facsimile using the this modem apparatus so as to perform the switching control from the facsimile body or automatically. Moreover, the modem signal after switching can be obtained by using a low speed modem as dedicated signal detection means, detecting a flag pattern after having completed an initial sequence consisting of detection of the presence (power) of an input signal, automatic gain control (AGC), carrier reproduction (PLL), timing synchronization, etc. and deciding that a signal for receiving a low speed modem signal has been received on the condition that at least one of the flag pattern has been detected.

7 Claims, 9 Drawing Sheets

FIG. 6
SYMBOLS USED IN CCITT FACSIMILE RECOMMENDATION

| SYMBOL | FUNCTION | SIGNAL FORMAT |
|---|---|---|
| OED | DISCRIMINATION OF CALLED OFFICE | 2100Hz |
| OFR | RECONGNITION OF RECEPTION PPEPARATION | X010 0001 1850 or 1650Hz (3 sec) |
| ORP | COMMAND RETRANSMIT | X101 1000 |
| OIG | DISCRIMINATION OF CALLIN TERMINAL | 1000 0010 |
| CNG | RINGING | 1100Hz, 500msec |
| CSI | DISCRIMINATION OF CALLED TERMINAL | 0000 0010 |
| DCN | COMMAND OF LINE DISCONNETION | X101 1111 |
| DCS | DIGITAL COMMAND SIGNAL | X100 0001 |
| DIS | DIGITAL IDENTIFICATION SIGNAL | 0000 0001 |
| DTC | DIGITAL TRANSMISSION COMMAND | 1000 0001 |
| EOM | END OF MESSAGE | X111 0001 1100Hz |
| EOP | END OF PROCEDURE | X111 0100 |
| FCF | FACSIMILE CONTROL FIELD | — |
| FIF | FACSIMILE INFORMATION FIELD | — |
| FTT | FAILURE OF TRAINING GROUP COMMAND | X010 0010 |
| GC | GROUP COMMAND | 1300Hz, 1.5~10.0sec 2100Hz, 1.5~10.0sec |
| GI | GROUP IDENTIFICATION | 1650 or 1850Hz |
| HDLC | HIGH LEVEL TRANSMISSION CONTROL PROCEDURE | — |
| LCS | LINE ADJUST SIGNAL | 1100Hz |
| MCF | CONFIRMATION OF MESSAGE | X011 0001 1650 or 1850Hz |
| MPS | MULTI PAGE SIGNAL | X111 0010 |
| NSC | NON-STANDARD FUNCTION COMMAND | 1000 0100 |
| NSF | NON-STANDARD FUNCTION | 0000 0100 |
| NSS | NON-STANDARD FUNCTION SETTING | X100 0100 |
| PIN | PROCEDURE INTERRUPTION NEGATIVE | X011 0100 |
| PIP | PROCEDURE INTERRUPTION POSITIVE | X011 0101 |
| PIS | PROCEDURE INTERRUPTION SIGNAL | 462Hz, 3 sec |
| PRI-EOM | PROCEDURE INTERRUPTION EOM | X111 1001 |
| PRI-EOP | PROCEDURE INTERRUPTION EOP | X111 1100 |
| PRI-MPS | PROCEDURE INTERRUPTION MPS | X111 1010 |
| RTN | RETRAINING NEGATIVE | X011 0010 |
| RTP | RETRAINING POSITIVE | X011 0011 |
| TCF | TRAINING CHECK | SUCCESSIVE "0" SIGNAL, 1.5 sec |
| TSI | TRANSMISSITON TERMINAL INDENTIFICATION | X100 0010 |

MULTIMODE MODEM FOR FACSIMILE

BACKGROUND OF THE INVENTION

The present invention relates generally to modulator-demodulators provided with plural modulator-demodulator functions having different signal processing standards, and more particularly to a modulator-demodulator which is optimized for use in a facsimile.

The modulator-demodulator, i.e. "modem," is a device for transmitting digital data using analog communications links, such as telephone lines. The communication system is specified as international standards or requirements of V-series recommendations by CCITT.

Modems are classified into low speed modems in which communication is done at a low speed up to about 300 bps, and high speed modems in which data transmission is at a high speed, recommended as CCITT V.27 and V.29 etc.; they have different modulation systems. A low speed modem is used for a control procedure which should be executed with precision even with low speed, and executes communication at the rate of 300 bps (bit per second) by means of frequency shift keying (FSK). On the other hand, a high speed modem is used for transmission of image or picture signal data at a high speed, and transmits the image data at a rate of 4800/2400 bps by means of phase shift keying (PSK) or at a rate of 9600/7200 bps by means of quadrature amplitude modulation (QAM); these are respectively specified in CCITT Recommendations V.27 ter. and V.29 for a G3 facsimile machine.

The modem incorporates modem circuits with plural standards. In particular, the modem for a facsimile machine almost necessarily incorporates plural standards since the facsimile itself incorporates plural standards of G3 (one minute machine standard, transmitting a sheet of A4 size manuscript for a time averagely shortened to one minute), G2 (three minute standard, transmitting a sheet of A4 size manuscript of manuscript for about three minutes), and G1 (six minute standard, transmitting a sheet of A4 size manuscript for about six minutes).

Moreover, it is required for the facsimile to use a modem for image signal transmission and a modem for procedure signals in different standards in order to assure the transmission control procedure; this requirement includes a concurrent operation of the plural modems with different standards for obviating erroneous sequence. Therefore, if all these standards must be satisfied by the facsimile machine as well as the modem device, the structure thereof and the control therefor will be complicated.

In particularly, in order to satisfy the requirement of concurrent operation of the modems, it was necessary to provide plural interfaces between the modems and the facsimile machine, and also necessary to provide a complicated method, in a main control section, for defining the meaning of a received signal and deciding for which of the plural modems the incoming signal is defined.

There have been proposed for the conventional facsimile the following typical three methods for discriminating which of a high speed modem signal and a low speed modem the incoming signal is defined.

Figure 1:
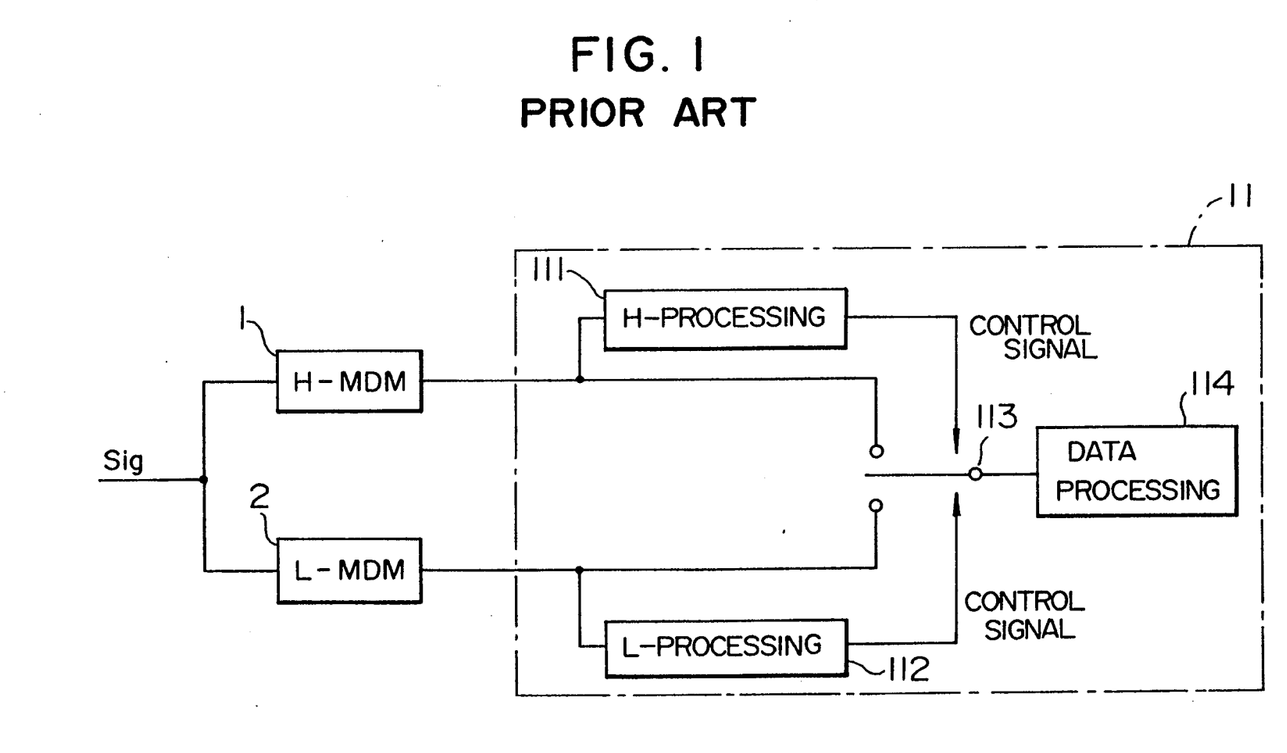
FIGS. 1 and 2 are functional block diagrams of the modem apparatus in the prior art facsimile machines.

(1) The first method is to concurrently operate a high speed modem H-MDM 1 and a low speed modem L-MDM 2 as shown in FIG. 1 for a facsimile host controller to check data of a line signal Sig. in a facsimile body 11. More specifically, the high speed modem H-MDM 1 demodulates the line signal in accordance with requirement T4. On the other hand, the low speed modem L-MDM 2 demodulates the line signal in accordance with the requirement T30. Both signals thus demodulated are sent to a facsimile body 11.

In response to this, whether the incoming signal is defined for the high speed modem or the low speed modem is decided by an H-processing device 111, and an L-processing device 112 within a control section located in the facsimile body 11. In accordance with this decision, a switch 113 is connected with the modem side which has produced the proper demodulated data. Thus, the selected signal is sent to a data processing section 114 so as to perform a proper facsimile communication operation.

(2) The second method is to carry out the discrimination in a sequence.

Figure 2:
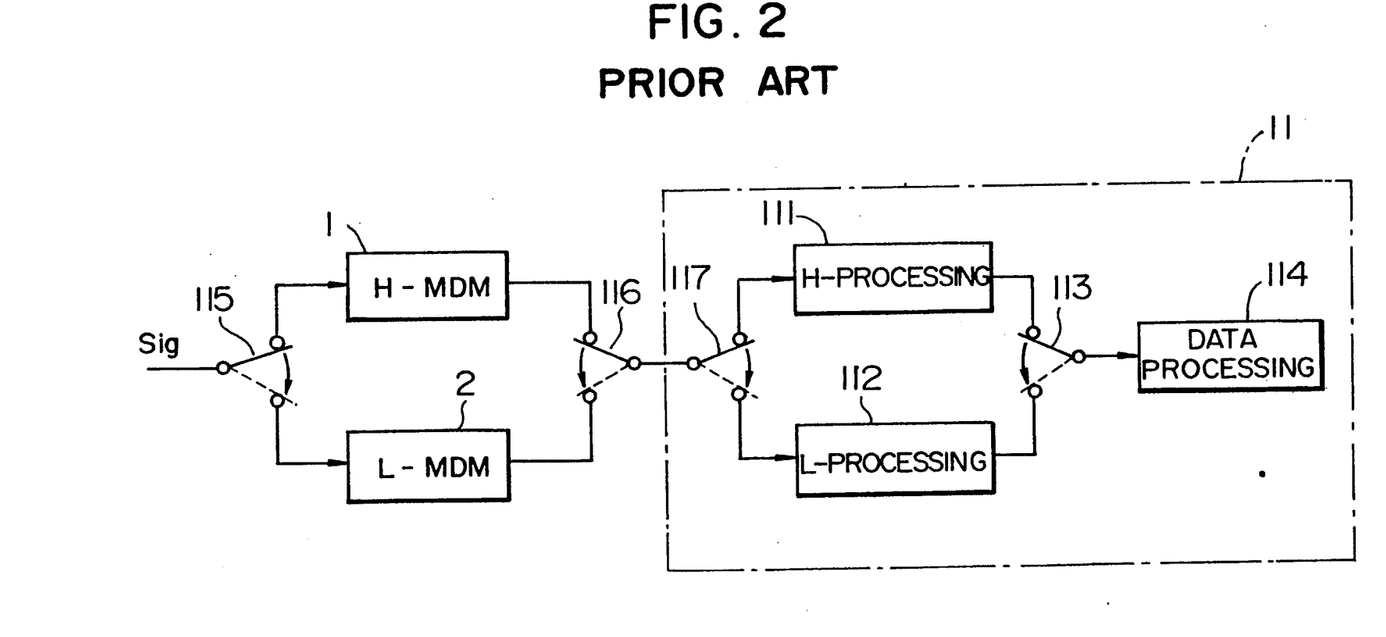

When the line signal Sig. has data, the signal for one modem which can easily be found for a short time is earlier subjected to signal receipt processing; if the processing result for a predetermined time is NG, the signal receipt processing is switched to the other modem. In the example shown in FIG. 2, the high speed modem H-MDM 1 and the H-processing device 111 are first operated; if the processing result for a predetermined time is NG, the signal reception processing is changed to the low speed modem L-MDM 2 and L-processing device 112 by connecting switches 113, 115, 116 and 117 as indicated by arrows. This arrangement, in which a common input/output terminal for plural modems of the high speed modem and the low speed modem is exchanged by the switches, can be fabricated with a comparatively low cost.

(3) The third method is to use the result of detecting a training signal with a high speed modem requirement.

The method of (3) is to detect that the received signal is a high speed modem signal using a training signal of about several milli-seconds to several hundreds milli-seconds added to the head of the received high speed modem signal.

The conventional high speed modem mentioned above is liable to be influenced from noise and several kinds of waveform distortion within the telephone lines. In method (3), therefore, the modem exchange cannot be carried out properly as the case may be; even if this is successful, the signal for the modem after exchange cannot be obtained immediately.

The prior art of using the result of detecting the training signal is disclosed in ROCKWELL 1985 DATA BOOK p. 7-7 to 7-19, R96 FAX 9600 BPS FACSIMILE MODEM.

The form of realizing a modem has been miniaturized and economized, namely, in structure, from a box type in which a large number of electronic circuit boards are packaged inside a large box to a card type in which the modem is packaged on a sheet of electronic circuit board, and in function, from a type of simultaneously using plural modems to a unified type of executing plural modem functions at a common input/output terminal. Either type, however, sacrifices concurrent operations of the plural modem functions and so is uncertain in switching the modem function. The above prior art also suffer from such a disadvantage.

SUMMARY OF THE INVENTION

The present invention provides a modem which can accurately switch modem function and be optimized for use in a facsimile.

The present invention also provides a modem which can immediately output a modem signal after switching modem function.

The present invention further provides a compact and inexpensive modem incorporating plural modem functions.

The present invention also eases the processing burden for a facsimile host controller by partially shifting the processing capability of the facsimile host controller to the modem.

Modems with required standards selected from concurrently operating modems with different standards incorporated in a modem apparatus can achieve these characteristics. The modems incorporate, in a common input/output port, means for selectively switching an input/output of each modem and signal detection means required for the switching. Furthermore, a facsimile using this modem apparatus can perform the switching control from the facsimile host controller or automatically.

The present invention can also be attained by using a low speed modem as dedicated signal detection means, detecting a flag pattern after having completed an initial sequence consisting of detection of the presence (power) of an input signal, automatic gain control (AGC), carrier reproduction (PLL), timing synchronization, etc. and deciding that a signal for receiving a low speed modem signal has been received if at least one of the flag pattern has been detected. Incidentally, the output received data is mark-held during the initial sequence.

All of the above functions can be incorporated on one chip.

The operation of the present invention will be explained in connection with embodiments of the present invention.

The modems are concurrently operated in such a manner that a low speed modem and the other modems are selected. The signal detection means detects a flag pattern from the output from the low speed modem through a dedicated detection means. Which modem should be used between the low speed modem and the other modem is decided using the detected signal, and the modem which has been used is changed to the other modem.

A G3 facsimile mode uses both high speed modem and low speed modem. In this case, the low speed modem only requires one-tenth S/N as large as the high speed modem. The G3 mode facsimile, therefore, can carry out a correct signal receiving operation even if the high speed modem is placed in a very poor operation state.

Moreover, the G3 facsimile mode is previously standardized so as to necessarily transmit a serial flag pattern prior to data transmission in the low speed modem. The modem, therefore, can be selected by detecting whether the signal to be received by the low speed modem has data using the flag pattern in the output from the low speed modem.

In detecting the flag, the output received data is mark-held regardless of the received data during an initial transient time after the low speed modem has started data reception, i.e. the initial sequence period, and to detect the flag starts after initial transient. The signal detection, therefore, can be made with very high stability and reliability unless the line condition is so serious that the received data is meaningless.

By incorporating the functions mentioned above in VLSI, it is possible to realize an accurate operation and a miniaturized package with reduced number of terminals, thereby leading to the miniaturization and economization of the modem according to the present invention.

BRIEF DESCRIPTION OF THE DRAWINGS

Preferred embodiments of the present invention will now be described in conjunction with the accompanying drawings, in which:

FIG. 6 is a table showing symbols in CCITT Facsimile Recommendation T.30 which should be applied to the present invention;

DESCRIPTION OF THE PREFERRED EMBODIMENTS

The modem apparatus according to the present invention will be explained in connection with several embodiments shown in the drawings.

Figure 3:
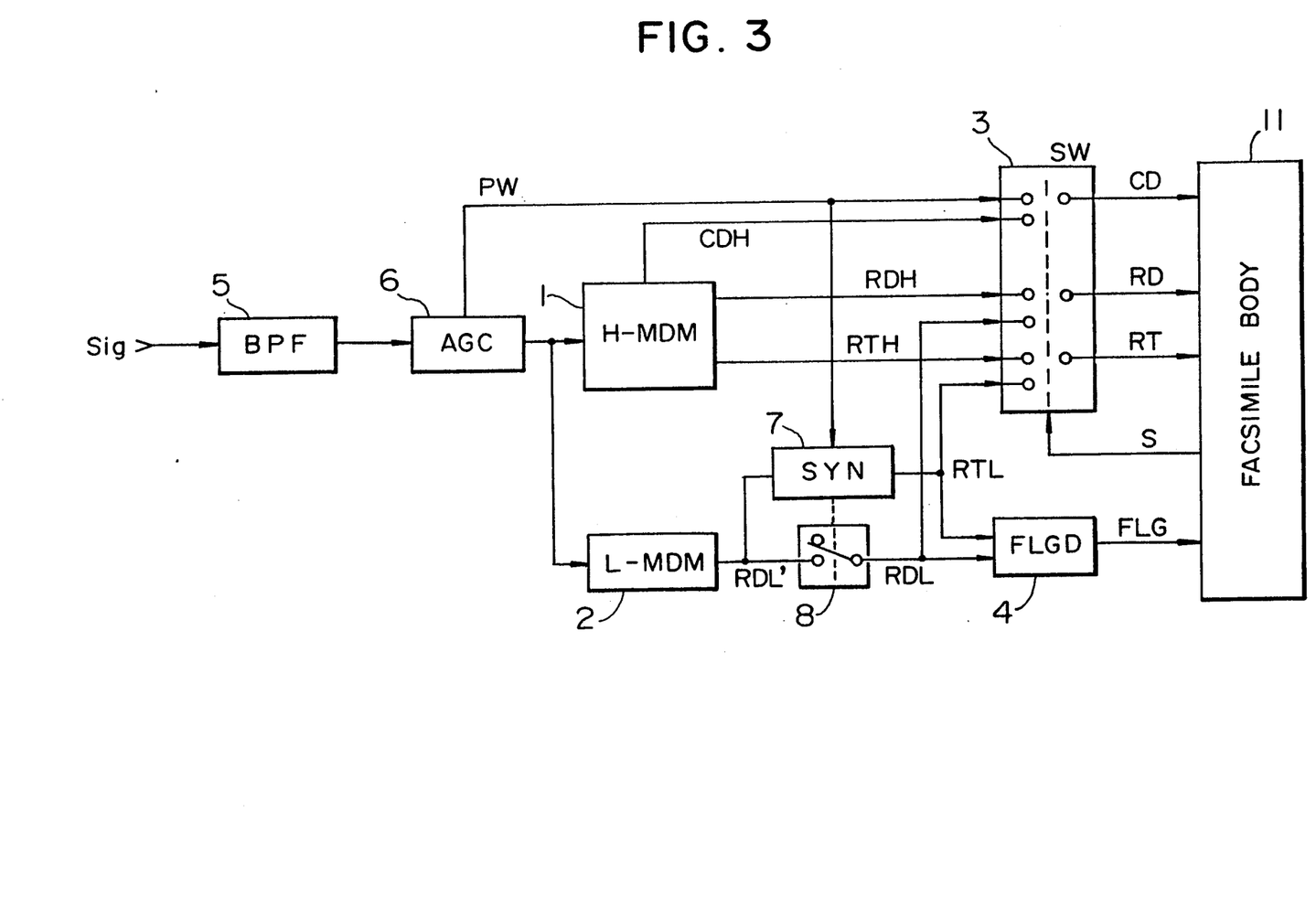
FIG. 3 is a functional block diagram of the modem apparatus according to one embodiment of the present invention.

FIG. 3 is a functional block diagram of the modem apparatus according to the present invention. In FIG. 3, 1 is a signal receiving part (H-MDM) of a high speed modem in Recommendation V.29, V.27 ter, etc.; 2 is a higher band side channel signal receiving part (L-MDM) of a low speed modem in Recommendation V.21; 3 is a switch for selecting the outputs from the modems; 4 is a flag detection circuit (FLGD) for detecting a flag signal from the output from the low speed modem; 5 is a bandpass filter; 6 is an automatic gain control circuit (AGC); 7 is a synchronization circuit for reproducing the signal receiving timing in synchronism with the output data from the low speed modem; and 8 is a mark-hold circuit for holding the received data until the low speed 2 is placed in a stationary signal receiving state.

Incidentally, although not shown, the modem apparatus also requires, in addition to the components mentioned above, standardized signal receiving parts and the corresponding transmission parts, and further requires means for controlling the sequence of the modem apparatus itself. They, however, are known and in particularly, the controlling means can be constituted by e.g. a microcomputer, so that they are not explained here.

In operation, an input signal Sig. to the modem apparatus, after its component outside the band required for modem operation has been removed by the bandpass filter 5, is supplied to AGC 6 in which the presence of the input signal is always monitored. The presence of the input signal is decided in terms of the signal power. If a judgment that the input signal exists is made, the PW (power) signal becomes "ON", ("H" level), and also is supplied with a suitable gain so that the average power of the output from AGC 6 is constant.

The output from AGC 6 is simultaneously sent to H-MDM 1 and L-MDM 2 to demodulate predetermined signals. Of these signals, the received data in H-MDM 1 (Receive Data High Channel: RDH), the received timing-signal (Receive Timing High Channel: RTH), and a signal (Carrier Detect High Channel) indicative of that RDH is valid are sent to the switch SW 3, respectively. On the other hand, L-MDM 2, which is in a frequency shift keying (FSK) system, does not produce a signal other than the received data (Receive Data Low Channel:RDL') from its demodulation part.

The data RDL' contains a changing point of the received data which is used in the FSK system to reproduce a received timing signal (Receive Timing Low Channel: RTL). The data RDL' is mark-held in the mark-hold circuit 8 until the timing signal RTL is synchronized with the data RDL; the data RDL resulting from the mark-holding is produced from the mark-hold circuit 8. Thus, it appears that the data RDL and the timing signal have been generated from L-MDM 2, which are sent to SW 3. The PW signal is substituted for the signal corresponding to the signal CDH for H-MDM 1.

The data RDL (but not RDL') and the timing RTL are supplied to the flag detection circuit (FLGD) 4 which tests the data RDL at the timing of RTL to check whether or not the sequence of the data is "0111111001111110, i.e. the flag "01111110" sequence doubly continues. If a flag signal has been detected, the flag signal FLG is made "ON" ("H") while the timing of 8 bits is received. On the other hand, if the flag signal has not been detected, the flag signal is made OFF ("L").

In response to a selection signal S input to SW 3 from, e.g., the control part of the facsimile body 11, either the output from H-MDM 1 of that from L-MD-I 2 is selected.

The operation of this embodiment will be explained below.

Figure 4:
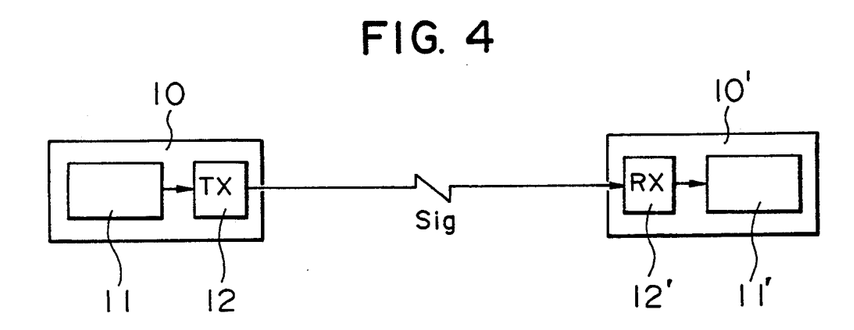
FIG. 4 is a view for explaining the using state of the modem apparatus.

FIG. 4 shows the schematic connection of the modems. As seen from FIG. 4, facsimile machines 10 and 10' consist of bodies 11 and 11' for transmitting-/receiving signals and modems 12 and 12', respectively. FIG. 4 is directed to the case where the signal is transmitted from the facsimile 10 to the facsimile 10'; the left side uses the transmission part of the facsimile whereas the right side uses the receiving part of the facsimile. In the actual signal transmission, however, signals are transmitted alternatively in both directions in a half-duplex operation. This operation will be explained with reference to FIG. 5.

Figure 5:
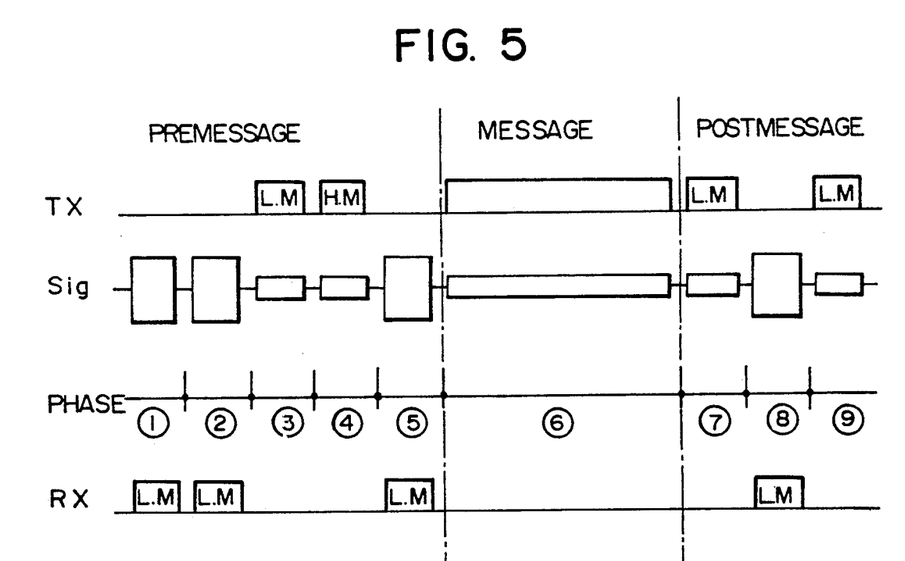
FIG. 5 is a timing chart for explaining the operation of the modem apparatus according to one embodiment of the present invention.

In FIG. 5, Tx and Rx indicate the manner of generating signals on the transmission side and on the receiving side, respectively, and Sig. indicates the line signal monitored on the receiving side. FIG. 5 is directed to the G3 facsimile procedure consisting of 9 (nine) phases 1 to 9. In Phase 1, a called response (tone signal) is made on the receiving side to receive a CED (called station) signal. In Phase 2, communication capability is informed to the transmission side using DIS's (Digital Identification Signal) through device identification indication (low speed modem:FSK signal). In Phase 3, when the transmission side receives these signals, the mode to be transmitted, e.g. manuscript size, linear density and the communication speed in the high speed modem are measured; they are as a reception command DCS (Digital Command Signal) to the receiving side through the low speed modem. In Phase 4, a signal indicative of the transmission in a communication path, i.e. the signal TCF (Training Check Field) for measuring the error rate is sent out through the high speed modem. The receiving side places the high speed modem in a reception standby state in accordance with the reception command and measures the error rate. If the quality enough to receive image signals is provided, in Phase 5, a signal CFR (Confirmation Signal) indicative of the completion of reception stand-by is sent through the low speed modem. In Phase 6, the high speed modem is placed in the reception standby state again. When the transmission side receives the signal CFR in Phase 5, in Phase 6 it exchanges the modem to the high speed modem to transmit the image signal.

Thus, when one page of the manuscript has been transmitted, if there is a next page thereof to be transmitted, a page completion signal, i.e. MPS (MultiPage Signal) is selected and is transmitted through the low speed modem again in Phase 7. On the other hand, when the receiving side has received the page completion signal MPS in the image signal transmitted through the high speed modem, it exchanges the modem to the low speed modem to receive the MPS signal by the low speed modem.

If there is not any next page, in Phase 7, a message completion signal i.e. EOM (End of Message) signal is sent out from the transmission side. Then, in Phase 7, the receiving side informs, by a signal MCF (Message Confirmation) through the low speed modem, the transmission side of the image signal has been received to provide sufficient quality in Phase 8 (Phase 8). In response to this MCF signal, the transmission side sends a line opening command signal EOP (End of Procedure) to the receiving side through the low speed modem in Phase 9. Thus, facsimile communication and completed.

If further plural pages are to be sent, the transmission side informs the receiving side that communication is returned to Phase 2 by the signal EOM, or to Phase 6 by the signal. Thus, the communication is started from the phase again.

As described above, the present invention is characterized in that the communication is carried out using the high speed modem and low speed modem in accordance with their role. Further, a retry sequence is provided for transmission failure; for example, if the transmission side fails in the signal reception in Phase 5, the communication is returned to Phases 3 and 4 by a signal FTT (Failure of Training). Therefore, in Phase 6, the low speed modem as well as the high speed modem must be placed in a reception state. This is specified in CCITT facsimile Recommendation T.30 as shown in FIG. 6. This also applies to Phase 7; if the receiving side fails in Phase 6 or 7, it does not advance to Phase 8, but in Phase 7, awaits the result in Phase 6 or 7. Incidentally, in FIG. 5, H.M and L.M denote a high speed modem and a low speed modem, respectively.

Figure 7:
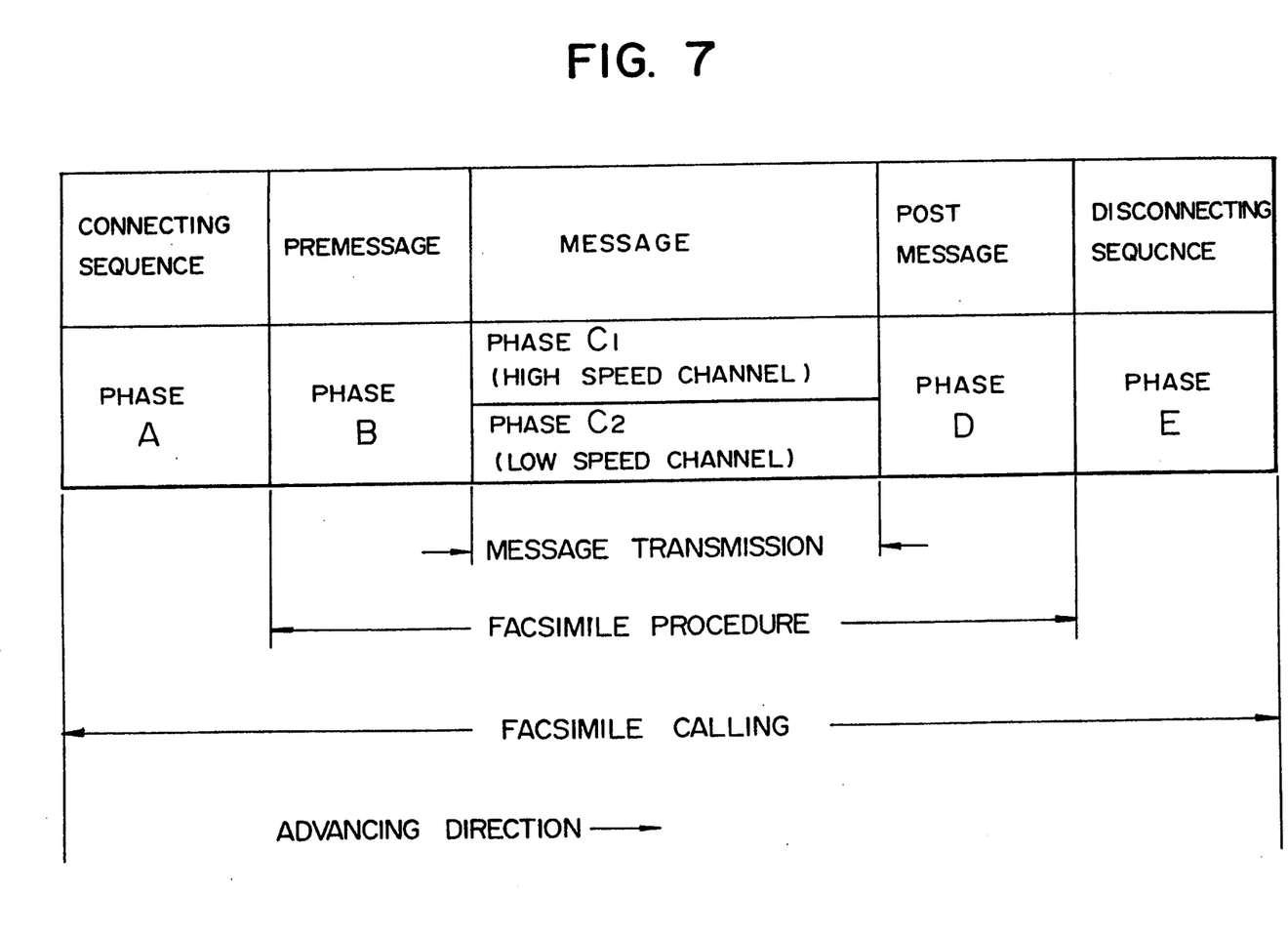
FIG. 7 is a diagram showing the time sequence of connection control of facsimile calling and message transfer which are applied to the present invention.

As understood from the above description, the G3 facsimile requires a concurrent operation of the low speed modem and the high speed modem. More specifically, the time sequence of the connection control of the facsimile calling in CCITT Recommendations and the message transmission is such as shown in FIG. 7. In FIG. 7, the operations or function sin Phases A to E are as follows.

Phase A: calling setting (connecting sequence) which is carried out manually or automatically.

Phase B: premessage procedure in which identification, instruction and confirmation, etc. for several functions relative to message transmission are carried out.

Phase C1: intermessage procedure in which synchronization in transmission of the message, error detection and modification, transmission path monitoring, and control of the multipage signal are carried out.

Phase C2: message transmission

Phase D: postmessage procedure in which the completion of the message completion and control of information relative to next message transmission are carried out.

Phase E: calling recovery (disconnecting sequence) which is manually or automatically carried out.

Although the facsimile uses the low speed modem and the high speed modem concurrently, as understood from the above description, actually, either the signal for the low speed modem or that for the high speed modem is transmitted at any time; therefore, it is unnecessary for the facsimile body to receive both signals simultaneously.

For this reason, in this embodiment, the signals that are actually transmitted are discriminated to exchange the modem as explained below.

Figure 8:
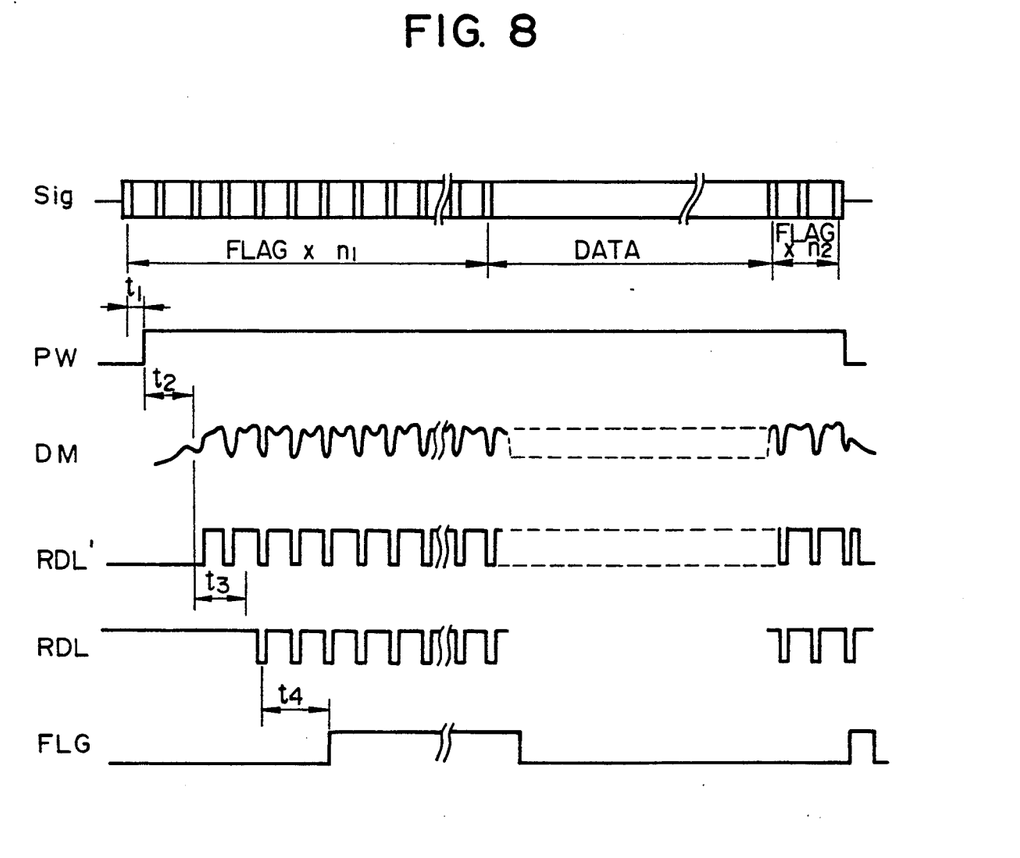
FIG. 8 is a waveform chart showing the respective signals for explaining the operation of the present invention.

FIG. 8 shows the waveforms at the respective parts in the modem apparatus according to the embodiment of FIG. 3. It is assumed in FIG. 8 that the incoming signal is defined for the low speed modem. The form of the low speed modem signal consists of a pre-flag part of $n_1$ flags ($n_1$: 35), data part, and a post flag part of $n_2$ flags ($n_2 > 1$); several kinds of information are transmitted in accordance with the content of the data part. Incidentally, the term "flag" means an 8 bit pattern with the bit sequence of "01111110"; since the transmission speed in the low speed is 300 bps, the preflag part continues for about one second ($8 \times 35 = 280$ bits).

In operation, when the signal Sig. in FIG. 8 is supplied to the circuit of FIG. 3, the AGC part 6 decides if the signal has magnitude enough to receive. It takes a period $t_1$ (e.g. 5 msec) for this judgment. When the signal has data, the PW signal becomes "H", and when the signal has gone, the signal PW becomes "L".

Signal DM, which is a demodulated waveform in L-MDM 2, enters its normal demodulation state after $(t_1+t_2)$ sec (e.g. 15 to 20 msec) from when the signal has data. Namely, the time required for AGC (automatic gain control) and reproduction is $(t_1+t_2)$ sec.

Therefore, signal RDL', which is obtained by digitizing the signal DM in its amplitude direction, cannot provide its correct waveform during the period $(t_1+t_2)$ after the signal Sig. has data.

Although the signal DM is modulated in accordance with modulation timing signals, the demodulation side cannot know it. Therefore, it is necessary to reproduce the timing from the level changing point of RDL'. This is carried out in such a manner that the phase at the changing point of RDL' is first measured under free-running timing to be synchronous with the average timing (FAST timing) and timing is maintained using a timing PLL (phase-locked loop of random walk filter type). This is the function of SYNC 7.

In the FAST timing processing, the timing is initially set at the time when the changing point phase observed after $(t_1+t_2)$ has experienced two changing points, so that the period of $t_3$ is varied in accordance with the waveform of RDL'. The mark-hold circuit 8 is connected with its hold side until the FAST timing processing is completed. In this way, any error in detecting flags in FLGD 4 is automatically prevented. Also, even if RDL is externally output through SW 3, there is no fear that the external devices are subjected to RDL during the transient time.

When the mark-hold is released after $t_3$, FLGD 4 starts to detect the flags. The algorithm therefor is that a shift register and bit pattern comparator are operated for each reception of 1 (one) bit to detect two successive flags, and if the two successive flags have been detected, this detection result is maintained while an 8 (eight) bit data is received; signal FLG denotes the detection result.

The reason why no error generated in detecting the flags by FLDG 4 will be explained with reference to FIG. 9.

Generally, the modem cannot always accurately carry out the demodulation. Namely, the demodulation function has a reception limit. This limit depends on the manner of demodulation in the demodulation part, e.g. magnitude of a received signal, accuracy of a carrier wave, amount of noise, etc. Now it is assumed in FIG. 9 that the FSK signal within the limit has been received.

Figure 9:
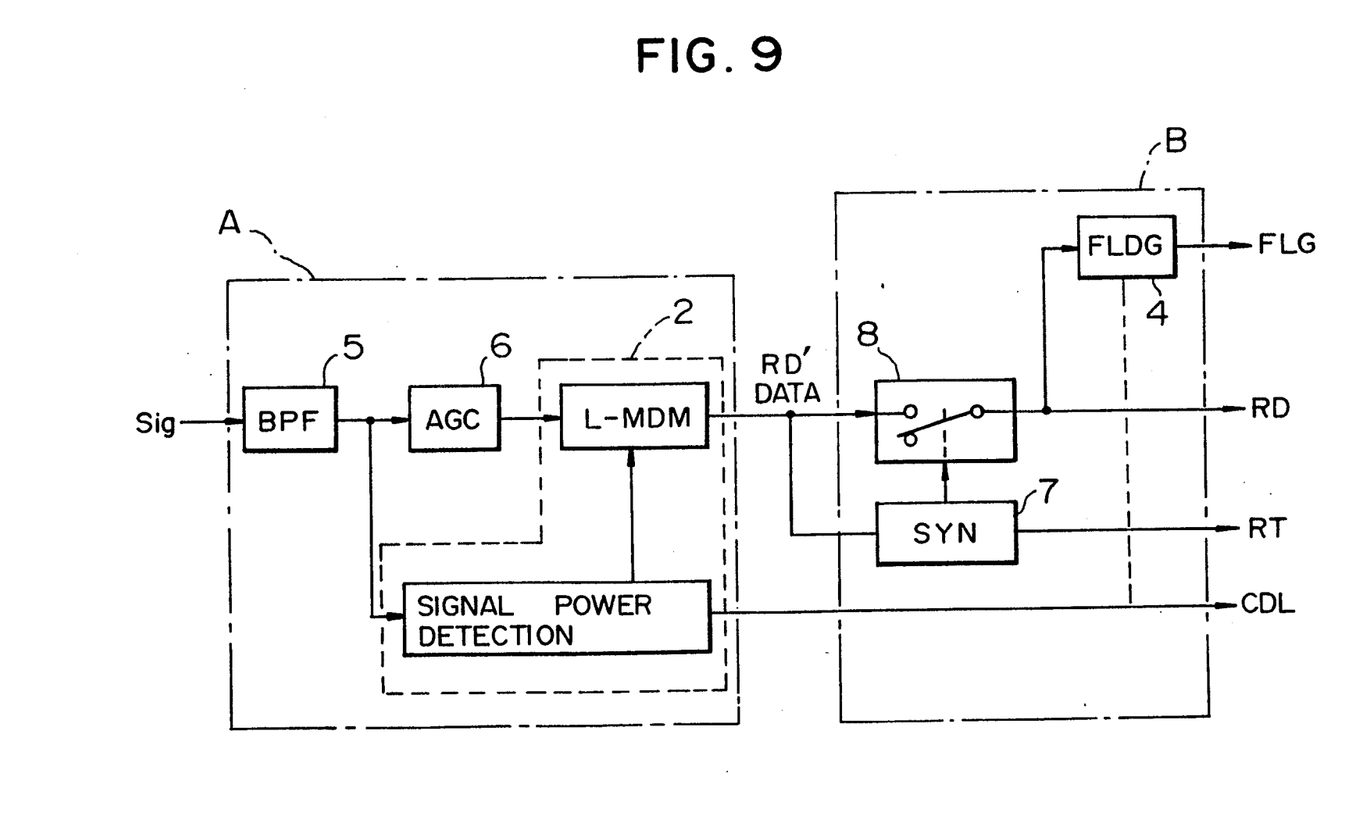
FIG. 9 is a block diagram for explaining the reason why the flag detection according to the present invention does not suffer from any error.

In FIG. 9, symbol A denotes a demodulation part of the conventional FSK modem, and symbol B denotes a demodulation part which is not provided in the conventional modem but in a facsimile body.

Now when an input signal has data, several phenomena occur for outputs RD' (data) and CDL from section A. Namely, at the initial time when the input signal starts incoming, the transient phenomenon in the neighborhood of the terminals occurs. Also during the period until AGC 6 and L-MDM 2 in section A enter their stationary state, the accuracy of the data provided at the terminal RD' cannot be assured. The section B in the facsimile body, therefore, cannot provide a correct operation if the flag detection is carried out regardless of the operation within the modem. More specifically, since a synchronization circuit (SYN) 7 in FIG. 9 can extract only from the data RD', the correct function of SYN 7 cannot be assured in the transient state when the accuracy of the data is defined; therefore, there is a possibility of erroneously detecting the data in the facsimile body.

On the other hand, in the case where the function of SYN is provided in the modem (but not in the facsimile body) in accordance with the present invention, it is possible to monitor the data RD' and the operation of SYN 7 at the rising edge and falling edge of the signal Sig. while the transient phenomenon occurs; the operation of FLDG 4 can be greatly stabilized. Incidentally, the synchronization circuit (SYN) 7 in FIG. 9 has a function of synchronization of synchronizing the rising edge and falling edge of the data RD' with output clocks by applying the clocks to the data.

In this way, in accordance with present invention, the information contained in the signal from the modem is efficiently used so that the flag detection can be accurately carried out.

As described above, RDL is processed so as to remove the rising transient state in the signal reception in L-MDM 2 and the detecting of two successive flags is performed using this processing result, so that L-MDM 2 remarkably reduces the error rate of the detection. Thus, the facsimile body can decide by the signal FLG if either L-MDM 2 or H-MDM 1 should be used, so that the burden to the facsimile can be reduced and also the exchanging of the modem can be surely made.

Meanwhile, although it appears that all the respective parts shown by blocks in FIG. 3 are constituted through hardware, the parts other than BPF 5 are actually implemented through software for DSP (Digital Signal Processor). An embodiment of the facsimile using the modem shown in FIG. 3 will be explained below.

Figure 10:
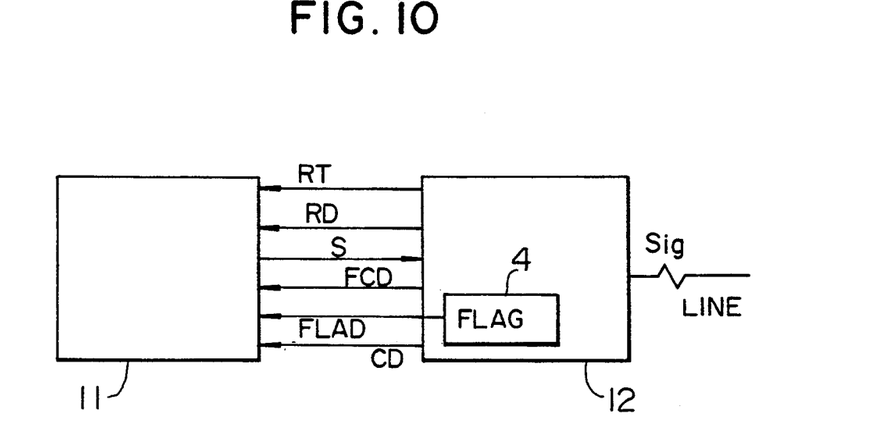
FIG. 10 is a block diagram of one embodiment of the present invention combined with a facsimile body.

As explained in connection with FIG. 4, the facsimile machine actually used consists of the facsimile body 11 and modem 12. FIG. 10 shows the manner of connecting the facsimile body 11 and the signal receiving part of the modem 12.

Figure 11:
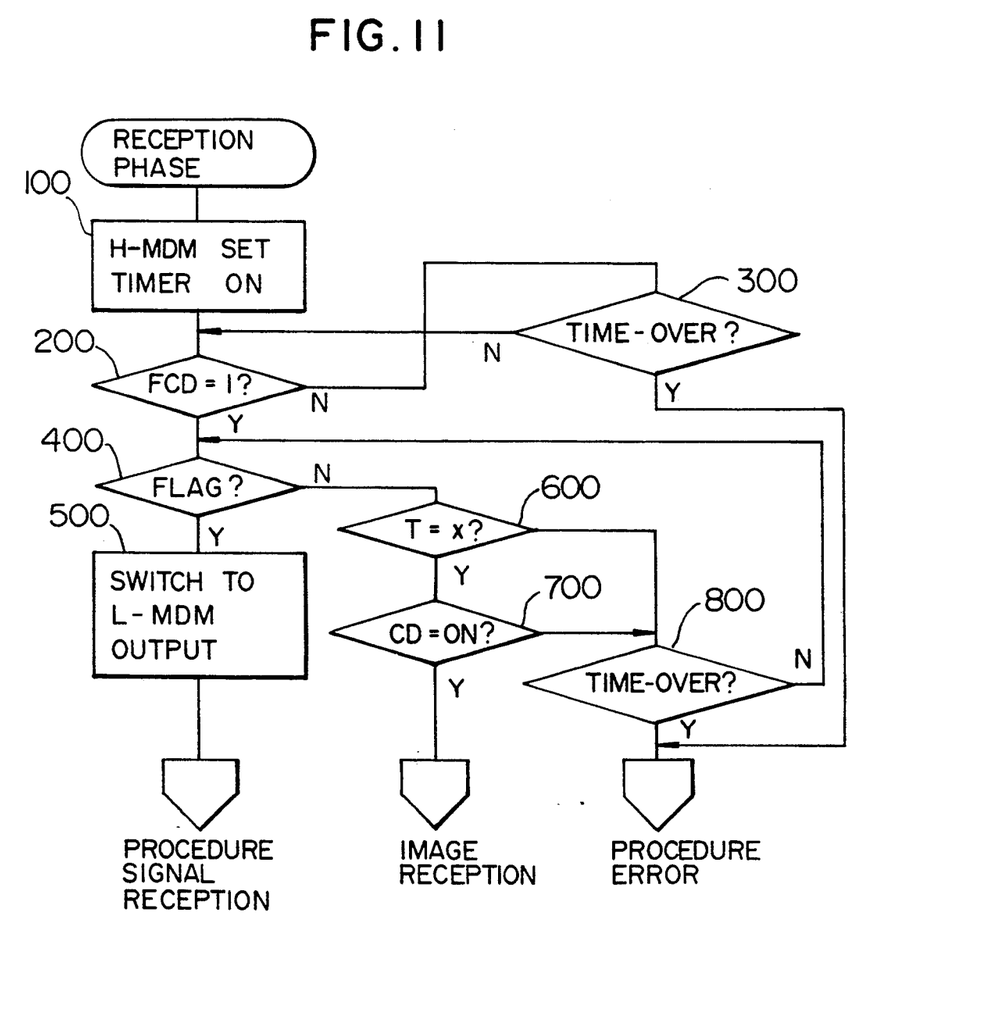
FIG. 11 is a flowchart for explaining the operation of the modem apparatus according to the present invention.

The operation of the facsimile machine will be explained with reference to FIG. 11. FIG. 11 shows a flow chart of C phase (CCITT Recommendation) in the facsimile procedure requiring a concurrent operation of modems. In C phase, it is expected to receive either an image signal or a control procedure signal.

First, when entering the signal receiving phase C, the input/output is exchanged into the high speed modem output, and the timer is set for the time permitted for processing, i.e. about 8 (six) sec (Box 100). This is because in the protocol in this requirement, a signal is to income within 6 sec. When the signal has data, FCD becomes "1" (Box 200) to shift to checking of signal contents. If the flag can be detected (Box 400), the input/output is exchanged into the low speed modem output (Box 500) to receive the procedure signal. If the flag is not detected, elapse of x sec (x=300 ms to 1 sec which depends on the speed of the modem) is waited (Box 600). If the training of the high speed modem has been completed (Box 700), the processing is shifted to the reception of the image signal. Thus, if these signals cannot be detected within the time set in the timer, i.e. 6 sec, this means a procedure error; the processing is shifted to the error processing (Box 800).

In the prior art in which an input/output is provided at a common terminal, it is impossible to carry out the processing in Box 400, which results in an erroneous operation owing to noise as the case may be. Also, in the prior art in which the modems are concurrently operated w~t out using the common terminal, the processing in Box 400 is carried out in the facsimile body 11. This increases the scale of terminals and the processings by the facsimile body.

On the other hand, in accordance with the embodiment, the high speed modem and low speed modem can be surely and easily used for different uses.

Moreover, although in this embodiment, all the blocks other than BPF 5 were formed by the software for DSP (Digital Signal Processor), they may be partially constituted by hardware. In particular, to constitute the flag detection circuit FLGD in hardware is efficient to reduce the number of dynamic steps of the software.

Furthermore, in this embodiment, the flag detection is made by two successive flags so that signal incoming for the low speed modem can be surely detected.

Further, in this embodiment, 8 (eight) bits of the flag detection result is held so that the detection result can be surely recognized by the facsimile body.

Further, the modem apparatus in accordance with the present invention may be formed on one-chip VLSI, and this embodiment greatly contributes to reduce the number of terminal pins of the LSI chip.

Further, the facsimile machine using the modem apparatus according to the present invention is economical since the interface for the modem 12 can be simplified in hardware and/or software.

In accordance with the present invention, the judgment required for exchanging the modem between H-MDM and L-MDM is carried out by L-MDM through the flag detection in the received signal obtained at the time except the initial sequence of the signal processing in L-MDM, so that the modem exchange can be surely made. Thus, the input/outputs for the plural modems can be made common.

Further, in accordance with the present invention, the number of terminal pins can be reduced in fabricating the modem apparatus in the form of VLSI, so that the modem apparatus can be greatly miniaturized and fabricated at lower cost.

Further, by using the modem apparatus according to the present invention, the interface thereof with the facsimile body can be simplified, and so the facsimile body itself can be fabricated at low cost.

Finally, in accordance with the present invention, the processing capability of the facsimile body is included in the modem apparatus, so that the processing burden to the facsimile body can be reduced.

What is claimed is:

1. A modem comprising:
   a) first modem circuit having a first input to receive a data signal and producing a first output based on said data signal in accordance with a first processing standard;
   b) a second modem circuit having an input to receive said data signal and producing a second output based on said data signal in accordance with a second processing standard, wherein said first and second processing standards are different;
   c) a common input/output circuit;
   d) means, coupled between an input to the common input/output circuit and both the output of the first modem circuit and the output of the second modem circuit, for selecting the input to the common input/output circuit from the outputs of the first and second modem circuits in accordance with a control signal; and
   e) means for generating said control signal based on an output of said second modem circuit;
   wherein said means for generating prevents erroneous operation; and
   wherein said first and second modem circuits are provided for transmission of facsimile signals, and said means for generating further comprises a controller, preventing erroneous operation by mark-holding facsimile data included in the received signal until either said first or second modem circuit establishes timing synchronization with the received signal.

2. A modem comprising:
a) first modem circuit having a first input to receive a data signal and producing a first output based on said data signal in accordance with a first processing standard;
b) a second modem circuit having an input to receive said data signal and producing a second output based on said data signal in accordance with a second processing standard, wherein said first and second processing standards are different;
c) a common input/output circuit;
d) means, coupled between an input to the common input/output circuit and both the output of the first modem circuit, and the output of the second modem circuit, for selecting the input to the common input/output circuit from the outputs of the first and second modem circuits in accordance with a control signal; and
e) means for generating said control signal based on an output of said second modem circuit;
wherein said means for generating prevents erroneous operation; and
wherein said first and second modem circuits are provided for transmission of facsimile signals, and said means for generating further comprises a controller detecting the power of the received signal and preventing erroneous operation by mark-holding facsimile data included in the received signal during a predetermined period beginning when the power of the received signal has been detected.

3. A modem comprising:
a) first modem circuit having a first input to receive a data signal and producing a first output based on said data signal in accordance with a first processing standard;
b) a second modem circuit having an input to receive said data signal and producing a second output based on said data signal in accordance with a second processing standard, wherein said first and second processing standards are different;
c) a common input/output circuit;
d) means, coupled between an input to the common input/output circuit and both the output of the first modem circuit, and the output of the second modem circuit, for selecting the input to the common input/output circuit from the outputs of the first and second modem circuits in accordance with a control signal; and
e) means for generating said control signal based on an output of said second modem circuit;
wherein said means for generating prevents erroneous operation; and
wherein said first and second modem circuits are provided for transmission of facsimile signals, and said means for generating further comprises a controller detecting the power of the received signal and preventing erroneous operation by mark-holding facsimile data included in the received signal until either said first or second modem circuit establishes timing synchronization with the received signal, and a predetermined period has elapsed from when the power of the received signal has been detected.

4. A modem comprising:
a) first modem circuit having a first input to receive a data signal and producing a first output based on said data signal in accordance with a first processing standard;
b) a second modem circuit having an input to receive said data signal and producing a second output based on said data signal in accordance with a second processing standard, wherein said first and second processing standards are different;
c) a common input/output circuit;
d) means, coupled between an input to the common input/output circuit and both the output of the first modem circuit, and the output of the second modem circuit, for selecting the input to the common input/output circuit from the outputs of the first and second modem circuits in accordance with a control signal; and
e) means for generating said control signal based on an output of said second modem circuit;
wherein said means for generating prevents erroneous operation; and
wherein said first and second modem circuits are provided for transmission of facsimile signals, and said means for generating further comprises a synchronization circuit having automatic gain control and a phase-locked loop for the received signal, said synchronization circuit preventing erroneous operation by delaying initiation of synchronization until either the automatic gain control or the phase-locked loop has reached steady state.

5. A modem comprising:
a) first modem circuit having a first input to receive a data signal and producing a first output based on said data signal in accordance with a first processing standard;
b) a second modem circuit having an input to receive said data signal and producing a second output based on said data signal in accordance with a second processing standard, wherein said first and second processing standards are different;
c) a common input/output circuit;
d) means, coupled between an input to the common input/output circuit and both the output of the first modem circuit, and the output of the second modem circuit, for selecting the input to the common input/output circuit from the outputs of the first and second modem circuits in accordance with a control signal; and
e) means for generating said control signal based on an output of said second modem circuit;
wherein said first and second modem circuits are provided for transmission of facsimile signals, wherein said means for generating comprises means for detecting whether a predetermined flag is include din the received data signal; and
wherein after said flag has been once detected, its indication is held for a predetermined transmission time.

6. The modem according to claim 5, wherein said predetermined transmission time corresponds to one bit or eight bit data transmission time.

7. The modem according to claim 6, wherein when said flag is successively detected, said means for detecting indicates detection of said flag.

* * * * *

UNITED STATES PATENT AND TRADEMARK OFFICE
CERTIFICATE OF CORRECTION

PATENT NO. : 5,233,627

DATED : August 3, 1993

INVENTOR(S) : Yasuyuki KOZIMA et al.

It is certified that error appears in the above-identified patent and that said Letters Patent is hereby corrected as shown below:

On the title page, item [57], replace the ABSTRACT with the following ABSTRACT:

— ABSTRACT

A modem (modulator-demodulator) apparatus is provided with modem circuits having different signal processing standards and is optimized through a facsimile machine. This multimode modem for facsimile has functions of modulation and demodulation based on G3, G2 and G1 standard facsimile and based on the T.30 standard recommended by CCITT for hand shaking procedures before document communications with other facsimiles. The apparatus further has one input port for receiving a signal and one output port for outputting demodulated data. The modem can simultaneously demodulate the T.30 standard signal even though the output mode of demodulated data has been set in accordance with any of the G3, G2 or G1 standards. When the multimode modem for facsimile receives a turning order for the output port from a microprocessor unit, the modem immediately switches outputting data to the demodulated data following a flag signal based on the T.30 standard. —.

UNITED STATES PATENT AND TRADEMARK OFFICE
CERTIFICATE OF CORRECTION

PATENT NO.  : 5,233,627

DATED  : 3 August 1993

INVENTOR(S)  : Yasuyuki KOZIMA et al.

It is certified that error appears in the above-indentified patent and that said Letters Patent is hereby corrected as shown below:

| Column | Line | |
|---|---|---|
| 1 | 37 | Change "averagely" to --on the average--. |
| 1 | 39 | Delete "of manuscript". |
| 1 | 52 | Change "particularly" to --particular--. |
| 2 | 54 | Change "7-19" to --7-19--. |
| 4 | 21 | Change "using" to --operative--. |
| 5 | 3 | Change "ticularly" to --ticular--. |
| 5 | 22 | After "indicative" delete "of". |
| 5 | 53 | Change "L-MD-I 2" to --L-MDM 2--. |
| 6 | 8 | Change "informed" to --transmitted--. |

UNITED STATES PATENT AND TRADEMARK OFFICE
CERTIFICATE OF CORRECTION

PATENT NO.    :    5,233,627
DATED         :    3 August 1993
INVENTOR(S)   :    Yazuyuki KOZIMA et al.

It is certified that error appears in the above-indentified patent and that said Letters Patent is hereby corrected as shown below:

| Column | Line | |
|---|---|---|
| 6 | 30 | Change "exchanges" to --switches from--. |
| 6 | 52 | Change "and" to --is--. |
| 7 | 12 | Change "function sin" to --functions in-- |
| 8 | 29 | After "error" insert --is--. |
| 8 | 68 | Change "function of synchronization" to --synchronization function--. |
| 9 | 39 | Change "income" to --come in--. |
| 12 | 55 | Change "include din" to --included in--. |

Signed and Sealed this

Second Day of August, 1994

Attest:

BRUCE LEHMAN

Attesting Officer    Commissioner of Patents and Trademarks